(12) United States Patent
Kim et al.

(10) Patent No.: US 10,375,219 B2
(45) Date of Patent: Aug. 6, 2019

(54) MOBILE TERMINAL RELEASING A LOCKED STATE AND METHOD FOR CONTROLLING THE SAME

(71) Applicant: LG ELECTRONICS INC., Seoul (KR)

(72) Inventors: Byoungeul Kim, Seoul (KR); Youngchang Kang, Seoul (KR); Yoonwoo Lee, Seoul (KR); Jungwhan Kim, Seoul (KR)

(73) Assignee: LG ELECTRONICS, Seoul (KR)

( * ) Notice: Subject to any disclaimer, the term of this patent is extended or adjusted under 35 U.S.C. 154(b) by 0 days.

(21) Appl. No.: 15/920,014

(22) Filed: Mar. 13, 2018

(65) Prior Publication Data

US 2018/0367656 A1 Dec. 20, 2018

(30) Foreign Application Priority Data

Jun. 15, 2017 (KR) ........................ 10-2017-0075950

(51) Int. Cl.
*H04M 1/67* (2006.01)
*H04M 1/725* (2006.01)
*G06K 9/00* (2006.01)
*G06F 21/32* (2013.01)

(52) U.S. Cl.
CPC .............. *H04M 1/67* (2013.01); *G06F 21/32* (2013.01); *G06K 9/00087* (2013.01); *G06K 9/00228* (2013.01); *G06K 9/00255* (2013.01); *G06K 9/00288* (2013.01); *G06K 9/00302* (2013.01); *H04M 1/72569* (2013.01); *H04M 2250/12* (2013.01); *H04M 2250/22* (2013.01); *H04M 2250/52* (2013.01)

(58) Field of Classification Search
CPC .. G06F 3/017; G06F 21/31; G06F 2200/1637; G06F 3/0346; G07C 9/00158; G07C 9/00563; G07C 9/00079; G07C 9/00309; H04W 12/08; H04W 88/02; H04W 12/06
See application file for complete search history.

(56) References Cited

U.S. PATENT DOCUMENTS

| 9,229,235 | B2 * | 1/2016 | Ballard | H04W 76/10 |
|---|---|---|---|---|
| 2014/0085460 | A1 * | 3/2014 | Park | G06F 21/84 |
| | | | | 348/135 |
| 2014/0160078 | A1 * | 6/2014 | Seo | G06F 3/017 |
| | | | | 345/175 |
| 2015/0379252 | A1 * | 12/2015 | Tang | G06K 9/00892 |
| | | | | 726/19 |
| 2016/0085329 | A1 * | 3/2016 | Yim | G06F 21/35 |
| | | | | 345/173 |
| 2017/0140644 | A1 * | 5/2017 | Hwang | G08C 17/02 |
| 2018/0070389 | A1 * | 3/2018 | Morgan | G06F 9/452 |

* cited by examiner

*Primary Examiner* — Liton Miah
(74) *Attorney, Agent, or Firm* — Lee, Hong, Degerman, Kang & Waimey PC

(57) ABSTRACT

Disclosed are a mobile terminal and a method for controlling the same. The mobile terminal includes: a terminal body; a camera; a sensor configured to sense a raising gesture of the terminal body; and a controller configured to: activate the camera in response to the raising gesture; detect a face within an image received via the camera; and release a locked state of the mobile terminal based on a face recognition of the detected face.

15 Claims, 17 Drawing Sheets

MOBILE TERMINAL RELEASING A LOCKED STATE AND METHOD FOR CONTROLLING THE SAME

CROSS-REFERENCE TO RELATED APPLICATION

Pursuant to 35 U.S.C. § 119(a), this application claims the benefit of earlier filing date and right of priority to Korean Patent Application No. 10-2017-0075950, filed on Jun. 15, 2017, the contents of which are hereby incorporated by reference herein in its entirety.

BACKGROUND OF THE INVENTION

1. Field of the Invention

This specification relates to a mobile terminal capable of recognizing a gesture through a camera, and a method for controlling the same.

2. Background of the Invention

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions may include data and voice communications, capturing images and video through a camera, recording audio, playing music files through a speaker system, and displaying images and video on a display unit. Some mobile terminals additionally provide functions such as playing an electronic game, or executing a function of multimedia players. Especially, recent mobile terminals may receive multicast signal for providing visual content such as broadcasts, videos, or television programs.

As it becomes multifunctional, a mobile terminal can be allowed to capture still images or moving images, play music or video files, play games, receive broadcast and the like, so as to be implemented as an integrated multimedia player.

For minimized battery consumption, the mobile terminal converts a display unit into an off state when a predetermined time lapses, or maintains an Always On Display (AOD) state to provide only preset information. In this case, a power button should be clicked in order to wake up the display unit in an off state or an AOD state, and/or an additional operation to release a locked state preset for protection of privacy should be performed. Especially, when a user has a difficulty in using both hands, user's inconvenience is caused.

SUMMARY OF THE INVENTION

Therefore, an aspect of the detailed description is to provide a mobile terminal capable of easily performing a waking-up operation and releasing a locked state, through a user's intentional gesture to use the mobile terminal, and a method for controlling the same.

Another aspect of the detailed description is to provide a mobile terminal capable of logging a use's emotional state and a health state when a locked state of the mobile terminal is released, and a method for controlling the same.

Another aspect of the detailed description is to provide a mobile terminal capable of inputting a specific control command through a gesture together with a user's authentication, and a method for controlling the same.

To achieve these and other advantages and in accordance with the purpose of this specification, as embodied and broadly described herein, there is provided a mobile terminal, comprising: a terminal body; a camera; a sensor configured to sense a raising gesture of the terminal body; and a controller configured to: activate the camera in response to the raising gesture; detect a face within an image received via the camera; and release a locked state of the mobile terminal based on a face recognition of the detected face.

In an embodiment, wherein: the raising gesture corresponds to a movement of the mobile terminal which exceeds a threshold angle change and exceeds a threshold distance change within a reference time; the controller is further configured to change the mobile terminal from a first mode to a second mode in response to the raising gesture; and the face recognition is performed while the mobile terminal is in the second mode.

In an embodiment, the mobile terminal further comprises a touch screen, wherein the controller is further configured to activate the camera in response to the raising gesture when a degree of a first touch input received via the touch screen satisfies a predetermined condition.

In an embodiment, wherein the controller is further configured to: perform fingerprint recognition based on a second touch input to the touch screen while the face is being detected within the image received via the camera; and release the locked state based on a fingerprint recognition of the second touch input in addition to the face recognition of the detected face.

In an embodiment, the mobile terminal further comprises a touch screen, wherein the controller is further configured to control the touch screen to display a lock screen when the face is detected within the image received via the camera.

In an embodiment, wherein the controller is further configured to deactivate the camera when no face is detected within the image received via the camera within a preset time; and control the touch screen to display an updated notification related to an event at the mobile terminal.

In an embodiment, wherein: an indicator indicating that the face recognition is being performed is displayed on the lock screen; and the lock screen is changed to a lock release screen when the face recognition is successful.

In an embodiment, wherein: a notification indicating that the face recognition is successful is displayed on the lock release screen; and the controller is further configured to control the touch screen to display a lock release state setting menu in response to a touch input to the displayed notification.

In an embodiment, wherein the lock release screen is an execution screen of a preset application.

In an embodiment, the mobile terminal further comprises a touch screen, wherein the controller is further configured to: recognize a facial expression of the detected face during the face recognition of the detected face; and control the touch screen to display an execution screen of a particular application mapped with the recognized facial expression when the locked state is released.

In an embodiment, the mobile terminal further comprises a touch screen, wherein the controller is further configured to: recognize a facial expression of the detected face during the face recognition of the detected face; identify an emotion associated with a change in the recognized facial expression; and control the touch screen to display an image mapped with the identified emotion when the locked state is released.

In an embodiment, the mobile terminal further comprises a touch screen, wherein the controller is further configured to: determine biometric information of a user based on the detected face; and store the biometric information and control the touch screen to display a lock release screen when the locked state is released, wherein information related to the biometric information is displayed on the lock release screen for a predetermined time.

In an embodiment, the mobile terminal further comprises a touch screen, wherein the controller is further configured to control the touch screen to display: feedback information on a lock screen when the face recognition of the detected face is unsuccessful; and a screen related to another authentication method using the lock screen.

In an embodiment, wherein the raising gesture is sensed following an event at the mobile terminal, and the controller is further configured to: recognize a face gesture after the face recognition of the detected face is successful; and execute a particular action related to the event, wherein the particular action is mapped to the recognized face gesture.

In an embodiment, wherein the raising gesture is sensed following an event at the mobile terminal, and the controller is further configured to: cease output of notifications related to the event when a lowering gesture of the terminal body is sensed after the face recognition of the detected face is successful.

To achieve these and other advantages and in accordance with the purpose of this specification, as embodied and broadly described herein, there is provided a mobile terminal, comprising: a terminal body; a touch screen; a camera configured to maintain a constant activated state in a low-power mode; a sensor configured to sense a raising gesture of the terminal body, wherein the raising gesture corresponds to a movement of the mobile terminal which exceeds a threshold angle change and exceeds a threshold distance change within a reference time; and a controller configured to: detect a face within an image received via the camera in response to the raising gesture; control the touch screen to display a lock screen when the face is detected within the image received via the camera; and release a locked state of the mobile terminal based on a face recognition of the detected face.

In an embodiment, wherein: an indicator indicating that the face recognition is being performed is displayed on the lock screen; and the lock screen is changed to a lock release screen when the face recognition is successful.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Figure 1A:
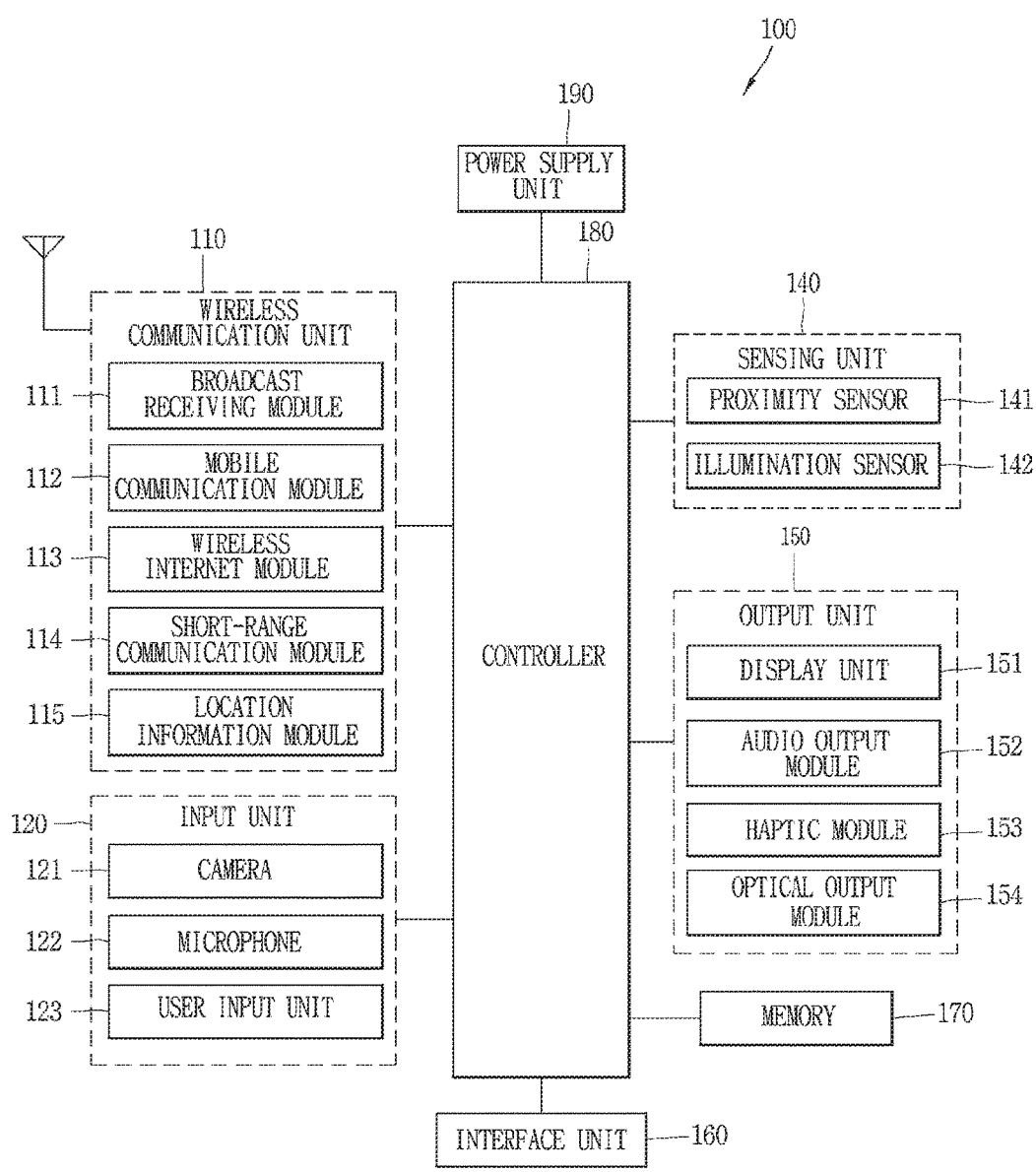
FIG. 1A is a block diagram of a mobile terminal in accordance with the present invention.

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart glasses), head mounted displays (HMDs), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and a digital signage.

Figure 1B:
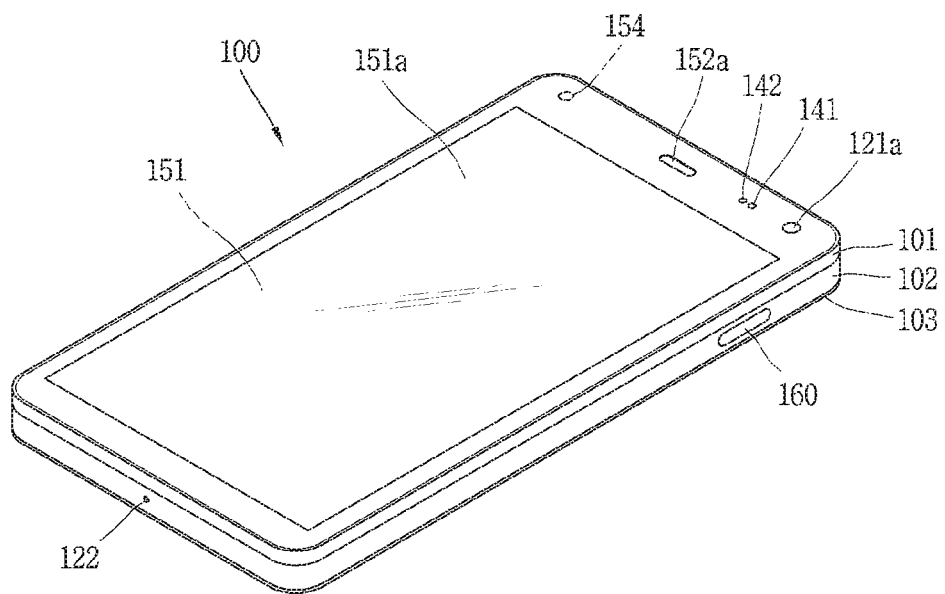
FIGS. 1B and 1C are conceptual views of one example of a mobile terminal according to the present invention, which are viewed from different directions.
Figure 1C:
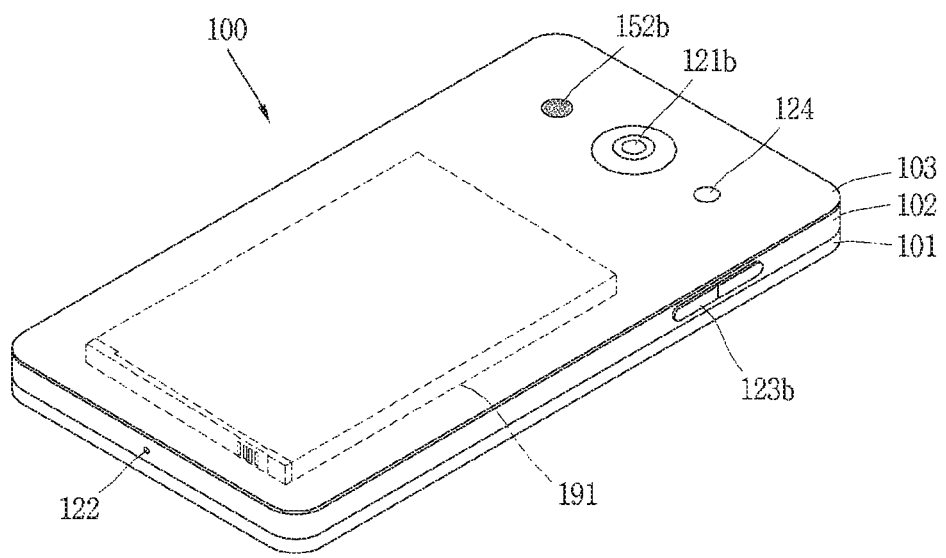

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components of FIG. 1A is not a requirement, and that greater or fewer components may alternatively be implemented.

Referring now to FIG. 1A, the wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), Wideband CDMA (WCDMA), High Speed Downlink Packet access (HSDPA), Long Term Evolution (LTE), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, GSM, CDMA, WCDMA, LTE and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH®, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

A magnetic sensor 143 indicates a sensor configured to detect an object approaching a predetermined surface or an object which exists nearby, and a position and a direction of the object, using a force of a magnetic field. That is, the magnetic sensor 143 indicates a sensor configured to measure a size and a direction of a peripheral magnetic field or a line of magnetic force. In the present invention, a plurality of 3-axis magnetic sensors 143a, 143b are provided at the mobile terminal 100 to more precisely sense a position and a direction of an object which generates a magnetic field.

For this, the plurality of 3-axis magnetic sensors 143a, 143b may be independent from each other, and may be spaced from each other in different directions. The controller 180 may execute a differentiated operation based on a size of a magnetic field measured by the plurality of 3-axis magnetic sensors 143a, 143b. More specifically, the controller 180 may detect a position, a direction, an angle, etc. of an object which generates a magnetic field, based on a size of a magnetic field measured by the plurality of 3-axis magnetic sensors 143a, 143b.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the mobile terminal. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

FIGS. 1B and 1C depict certain components as arranged on the mobile terminal. However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

A third camera 121c may be further provided on a front surface of the terminal body. In this case, the third camera 121c may be disposed near the first camera 121a, or near the opposite side to the first camera 121a (i.e., the optical output unit 154).

The third camera 121c may be provided with a wide angle lens. In this case, the third camera 121c may support a wider viewing angle than the first camera 121a. In a general angle mode, the first camera 121a may be activated for capturing. And in a wide angle mode, the third camera 121c may be activated for capturing. An image captured by the third camera 121c may include a larger number of subjects than an image captured by the first camera 121a. However, in this case, distortion occurs toward a peripheral part of a frame.

The third camera 121c may be activated together with or independently from the first camera 121a when the first camera 121a is activated. If the third camera 121c is activated together when the second camera 121b formed on a rear surface of the terminal body is activated, an image captured by the third camera 121c may be used to compensate for a white balance reference value of an image captured by the first camera 121a.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

When a pick-up gesture to lift the terminal body is sensed while the terminal body is in a sleep mode, the aforementioned mobile terminal 100 according to an embodiment of the present invention activates the camera 121 provided at the terminal body in the sleep mode, thereby detecting a face which exists within a view angle range. Then, the mobile terminal 100 may release a locked state of the terminal body by performing a user's face recognition based on the detected face.

Figure 2:
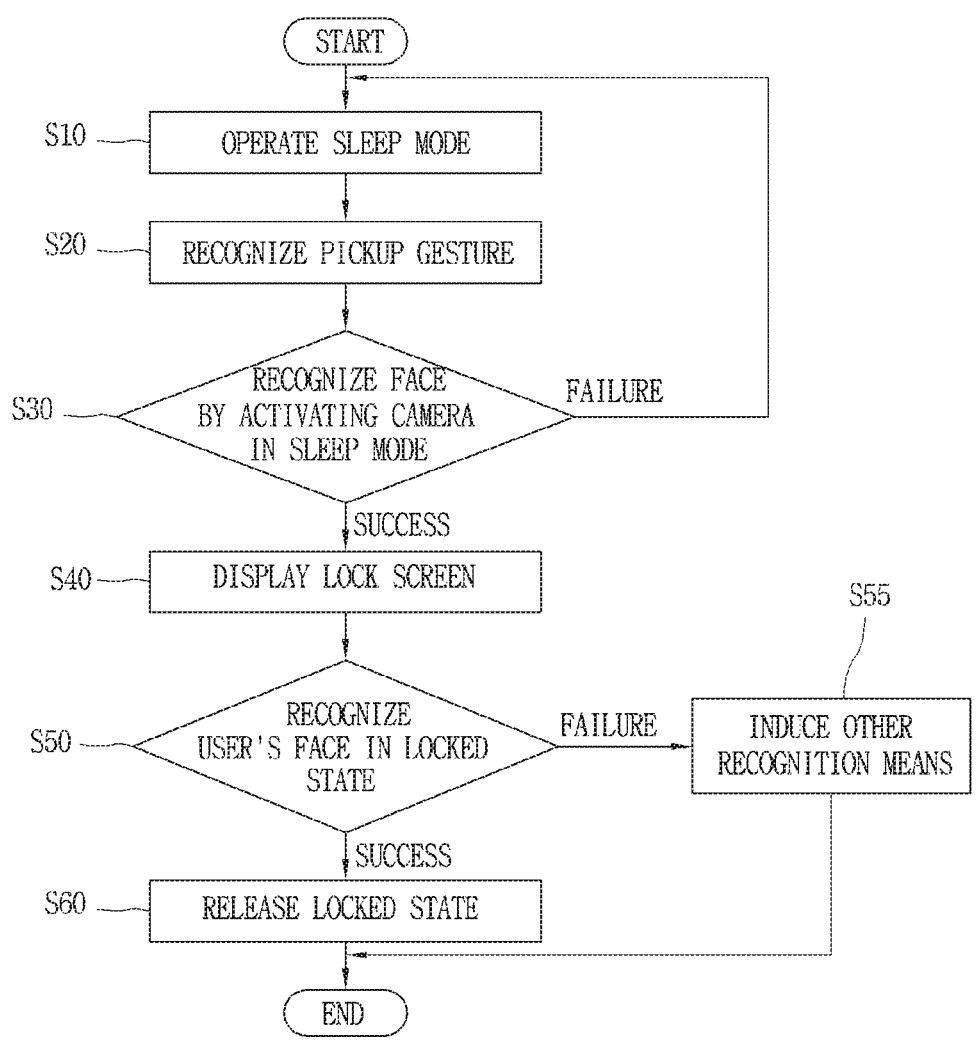
FIG. 2 is a representative flowchart for explaining an operation of a mobile terminal according to the present invention.

FIG. 2 is a representative flowchart for explaining an operation of the mobile terminal according to the present invention.

Referring to FIG. 2, the mobile terminal 100 according to the present invention is operated in a sleep mode (S10). The sleep mode means a state where the controller 180 not only receives a wakeup signal and senses occurrence of a pickup gesture to be explained later, but also stops power supply to other components of the mobile terminal. In the sleep mode, the display unit 151 maintains an off state or an Always On Display (AOD) state to output only preset information (e.g., time information, etc.) with a low power.

In the sleep mode, the controller 180 may sense occurrence of a pickup gesture through the sensing unit 140 of the mobile terminal 100 (S20). More specifically, if occurrence of a pickup gesture is sensed through a combination of at least two such as a geomagnetic sensor, a gyroscope sensor and an acceleration sensor, the sensing unit transmits a wakeup signal to wake some components of the mobile terminal while an off state or an AOD state of the display unit 151 is maintained, to the controller 180.

Hereinafter, such a wakeup signal may be referred to as a 'limited wakeup' signal in order to be differentiated from a wakeup signal for converting the display unit 151 into an on state. Therefore, unless otherwise specified, the 'wakeup signal' disclosed hereinafter means a signal to wake up a preset specific component (e.g., the camera) through power supply, while an off state of the display unit 151 is maintained.

Accordingly, if the aforementioned pickup gesture occurs, the controller 180 may perform only a limited operation in a sleep mode, i.e., while an off state or an AOD state of the display unit is maintained. In this case, battery consumption is relatively less than that when the sleep mode is released. This may reduce battery consumption due to frequent release of the sleep mode.

The pickup gesture may mean a movement to lift the terminal body within more than a preset angle range and by more than a preset distance. Further, the pickup gesture may mean not only a direct pickup gesture to lift the mobile terminal, but also a tilt gesture applied to the terminal body to incline the mobile terminal by a predetermined angle, and a pocket-out gesture to take the mobile terminal out of a pocket, a bag, etc. Hereinafter, a method to sense a pickup gesture will be explained in more detail with reference to the attached drawings.

In response to the occurrence of the pickup gesture, the controller 180 may activate the camera 121 in the sleep mode to detect a face which exists within a view angle range (S30). That is, the pickup gesture may be a limited wakeup signal for activating only the camera while maintaining the sleep mode of the mobile terminal.

For this, a face may be detected based on an image acquired by various types of image sensors. For instance, in case of a facial image, image information on a user's face may be acquired by a Complementary MOS (CMOS) image sensor, a Charge-Coupled Device (CCD) image sensor, an IR image sensor, etc. Then, a wakeup signal for converting the display unit to an on state may be transmitted to the controller 180 based on the acquired image information.

More specifically, if a face which is towards a front side based on the camera disposed on a front surface of the terminal body and configured to recognize a face has been detected, the controller 180 may determine a face detection. Further, the controller 180 may determine that a user's face has been detected only when the user's face is within a predetermined angle based on the camera 151.

Here, various face detection algorithms may be used. For instance, this can be achieved by learning a matching template through a forward image.

As another example, the controller 180 may determine a face detection when a user's face is positioned within a predetermined distance from the camera 121. For this, a distance between the camera 121 and the user's face spaced apart from the camera 121 may be measured through an additional sensor. For instance, the number of pixels of a face image according to a resolution is counted, and a user's face may be detected only when the number of the pixels exceeds a threshold value. Alternatively, a face may be recognized only when a size of a face image is within a preset range.

If a plurality of faces are detected through the camera 121, only one face which satisfies a preset condition may be detected. For instance, a face image having a shortest separating distance from the camera 121, a face image having a highest resolution, or a face image having a largest size may be detected from a plurality of obtained face images.

Once a specific face is detected, the display unit 151 is converted into an on state, and a lock screen may be displayed on the display unit 151 (S40). As a result, the sleep mode is completely released. On the other hand, if a face detection fails, the mobile terminal returns to the initial sleep mode. As a result, the camera 121 is converted into an inactivated state.

Continuously, the controller 180 performs a user's face recognition based on the detected face (S50). For this, it is assumed that a screen locking method of the mobile terminal is preset as a face recognition method.

The controller 180 compares a user's face pre-registered to the mobile terminal with the detected face. If it is determined that the user's face matches the detected face, the controller 180 releases a locked state. A user needs not perform any additional operation to release a locked state of the mobile terminal, and has only to maintain a gripped state of the mobile terminal for a predetermined time.

Then, a face recognition is successful after a predetermined time, the locked state of the mobile terminal is released (S60). As a result, the displayed lock screen is immediately converted into a lock release screen, for instance, a home screen. On the other hand, a face recognition fails, the controller 180 may induce an input of another recognition means through the display unit 151. For instance, a screen requiring another screen locking method such as a pattern input, a PIN input and a fingerprint input may be output to the display unit 151.

As aforementioned, in an embodiment of the present invention, a locked state of the mobile terminal such as a sleep mode may be released without an additional operation, through a user's gesture to intentionally lift the mobile terminal which is in the sleep mode. Further, since the sleep mode is completely released when a face is detected, battery consumption due to frequent release of the sleep mode is reduced. Further, since the user's gesture to intentionally lift the mobile terminal can be performed by one hand, there is not any difficulty due to a control using two hands which is appropriate for a locked state releasing input.

Hereinafter, a method of sensing a pickup gesture will be explained in more detail with reference to FIGS. 3A to 3E.

As aforementioned, the pickup gesture may be sensed through a sensor activated in a sleep mode of the mobile terminal, e.g., a geomagnetic sensor, a gyroscope sensor, an acceleration sensor, etc. Such sensors do not greatly influence on battery consumption due to their low battery consumption, even if they always maintain an activated state.

As aforementioned, the pickup gesture may be largely categorized into a direct pickup gesture to lift the mobile terminal (1), and a tilt gesture to incline the terminal body by a predetermined angle and a pocket-out gesture to take the mobile terminal out of a pocket, a bag, etc (2).

Figure 3A:
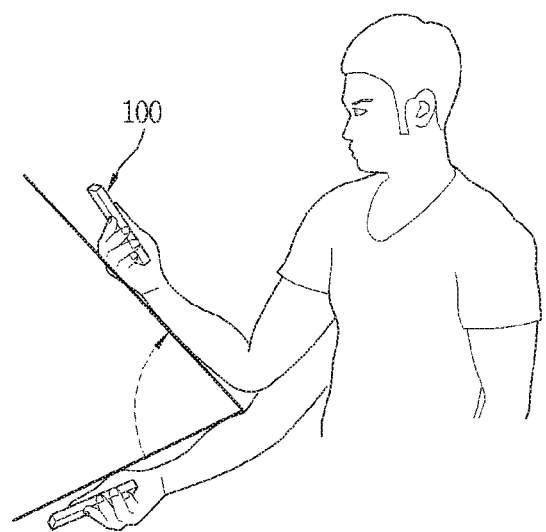
FIGS. 3A to 3E are exemplary conceptual views for explaining a method to sense a pickup gesture in a mobile terminal according to an embodiment of the present invention.
Figure 3B:
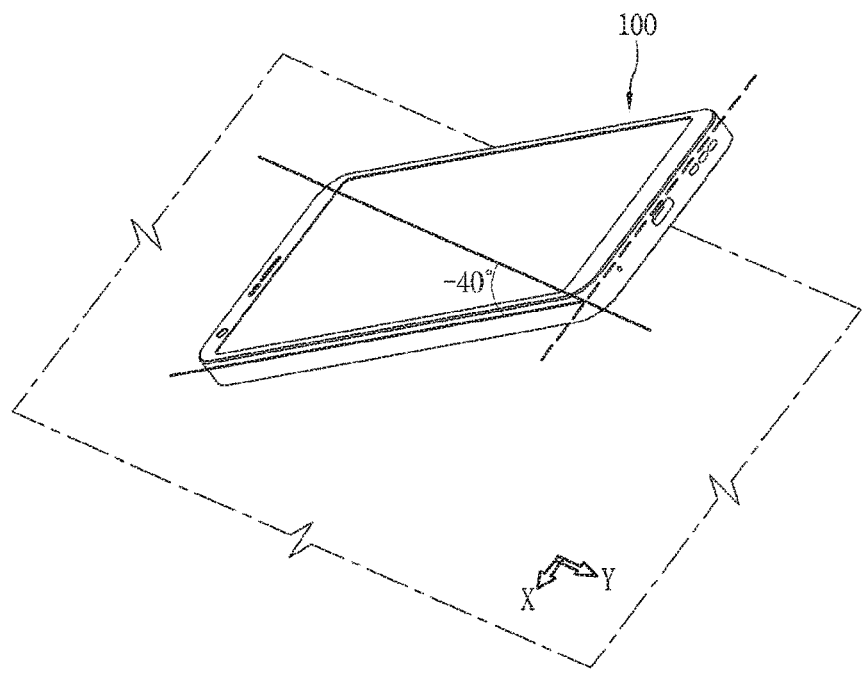
Figure 3C:
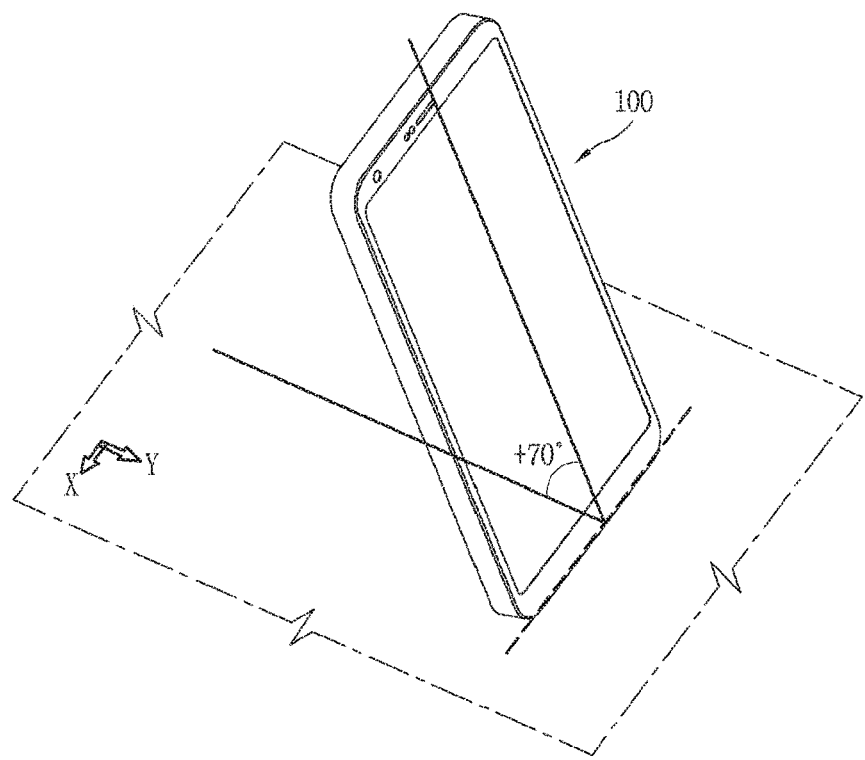
Figure 3D:
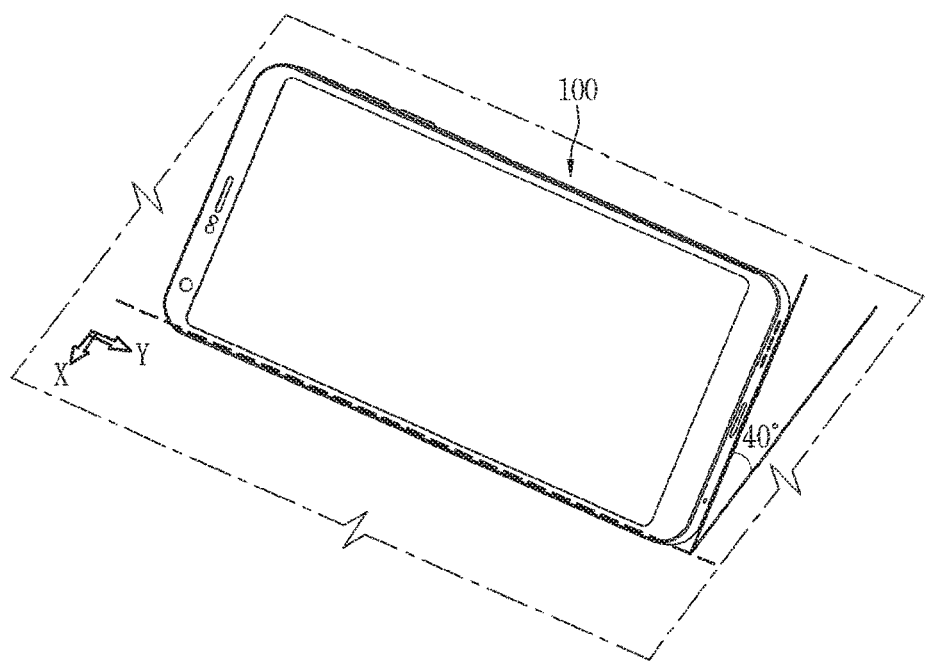
Figure 3E:
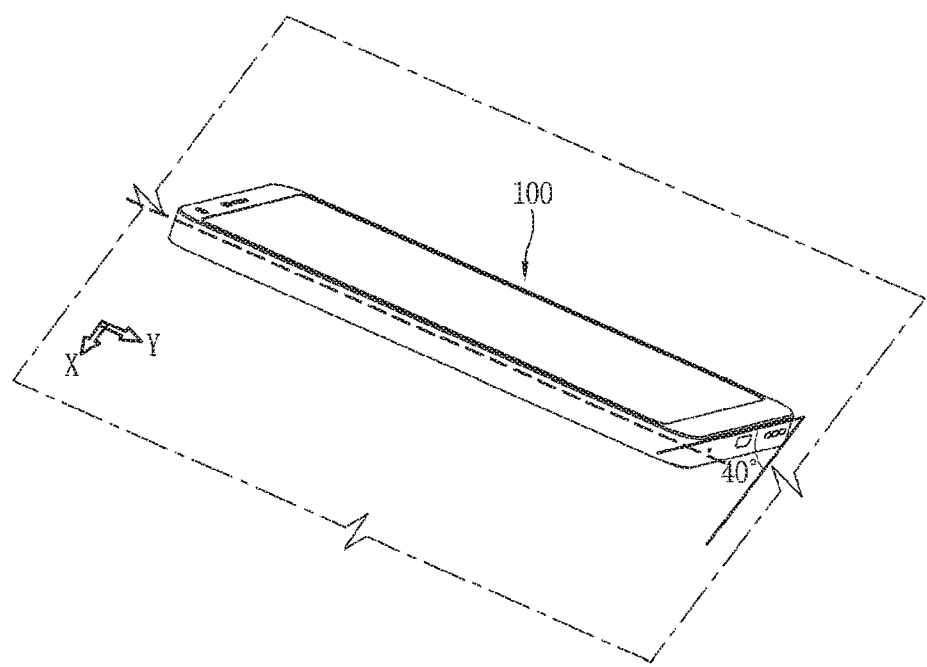

FIG. 3A shows an example of a pickup gesture to lift the terminal body of the mobile terminal 100.

In determining occurrence of such a pickup gesture, a state where the terminal body disposed on an object which satisfies a horizontal condition does not move for a predetermined time may be set as an initial condition.

The satisfying a horizontal condition may mean that a gradient of the mobile terminal which is disposed on an object, sensed through sensors, is within a range of about −15°~+25° in an X-axis and about −25°~+25° in a Y-axis.

Further, if the mobile terminal which is within such a range has not moved for more than a predetermined time, e.g., about 2 seconds~5 seconds, and if there is a subsequent gesture to lift the mobile terminal, it may be determined as occurrence of a pickup gesture. Here, the time for which the mobile terminal has not moved means a standby time for determining occurrence of a pickup gesture.

If an operation to lift the terminal body within more than a preset angle range and by more than a preset distance is sensed within a reference time, the controller 180 may determine that a pickup gesture has occurred. For instance, if the mobile terminal is upward moved by more than 3 cm at a speed of 30 cm/sec with satisfying a viewable angle, the controller 180 may determine that a pickup gesture has occurred.

As shown in FIGS. 3B to 3E, the viewable angle may mean that a gradient of the mobile terminal is within a range of about −40°~+70° in an X-axis and about −40°~+40° in a Y-axis. That is, the viewable angle means a range of a preset angle inclined for a user's face to be towards a front surface of the camera 121. The viewable angle is a gradient of the mobile terminal required for face detection, and is applied to all of a direct pickup gesture, a tilt gesture and a pocket-out gesture.

As another example, in case of a tilt gesture, if the proximity sensor of the mobile terminal is not blocked by an object as a condition for prevention of a gesture mal-recognition, and if a gripped state of the terminal body is maintained for a predetermined time, the controller 180 may determine occurrence of a pickup gesture. This is a case to perform a pickup gesture while a user grips the mobile terminal which is in a sleep mode.

The context that the gripped state of the terminal body is maintained for a predetermined time may mean that a gradient of the mobile terminal sensed to be within a range of ±20° in an X-axis and a Y-axis is maintained for about more than 2 seconds.

Further, if a gripped state of the terminal body is maintained for a predetermined time, if a gradient of the mobile terminal is being inclined by about more than 35° at a proper speed towards a user's face based on a user's hand which has gripped the mobile terminal, and if a viewable angle is satisfied, the controller 180 may determine that a pickup gesture has occurred in the gripped state of the mobile terminal. Here, the proper speed may be about 120°/second, for instance.

As another example, in case of a pocket-out gesture, an additional limiting condition for prevention of a gesture mal-recognition may include a condition which does not satisfy a horizontal state of the mobile terminal while the proximity sensor is blocked. In this state, if there is not an object which blocks the proximity sensor and if a viewable angle is satisfied according to a pocket-out gesture, the controller 180 may determine that a pickup gesture has occurred.

A user may change the aforementioned viewable angle through an input. For instance, the user may prevent another person's face from being detected together through the camera 121, by making a preset angle range more steep.

For instance, if a wakeup signal generated as the pickup gesture occurs is transmitted to the controller 180 in a first sleep mode of the mobile terminal, the first sleep mode may be converted into a second sleep mode for sensing a face.

The first sleep mode may mean an operation state of the mobile terminal which has a smaller amount of battery consumption than in the second sleep mode. In the first sleep mode, the controller 180 may not only receive a wakeup signal, but also stop power supply to other components. Alternatively, the first and second sleep modes may mean that an off state of the display unit 151 is maintained.

For instance, if no face is detected within a predetermined time in the second sleep mode, the controller 180 may immediately convert the second sleep mode into the first sleep mode without an additional input, in order to minimize battery consumption.

Figure 4A:
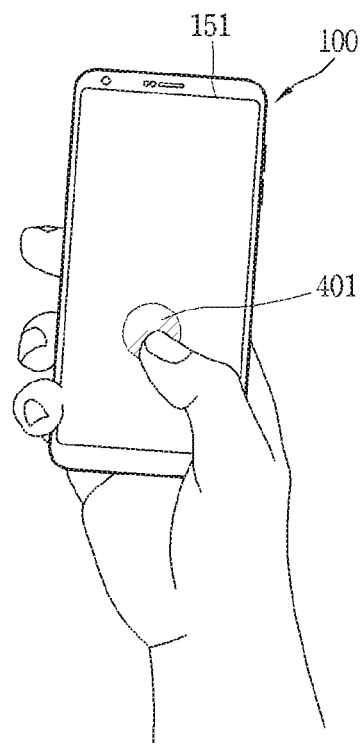
FIGS. 4A and 4B are conceptual views for explaining an additional limiting condition for face detection, in a mobile terminal according to an embodiment of the present invention.
Figure 4B:
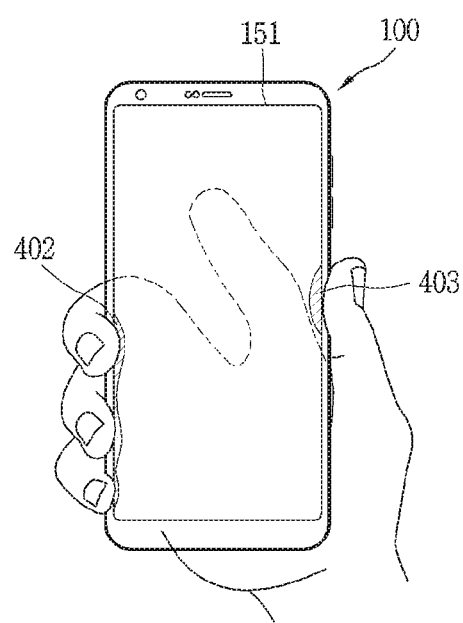

FIGS. 4A and 4B are conceptual views for explaining different examples of an additional limiting condition to enhance a recognition rate of a pickup gesture, in the mobile terminal according to an embodiment of the present invention.

When a pickup gesture is performed, a touch for gripping the mobile terminal at least occurs on a front surface or a side surface of the terminal body. As an additional limiting condition to enhance a recognition rate of a pickup gesture, may be used the touch screen 151 including a touch sensor disposed on a front surface of the terminal body, and/or an edge or a side frame disposed on a side surface of the terminal body and having a grip sensor for sensing a touch pressure. Although not shown, if a grip sensor is provided on a rear surface of the terminal body, whether a user has gripped the mobile terminal or not may be recognized through the grip sensor provided on the rear surface of the terminal body.

FIG. 4A shows a case to determine occurrence of a pickup gesture, in a condition that a touch 401 having a pressure exceeding a reference pressure is applied to the touch screen 151.

More specifically, the controller 180 may determine whether to activate or deactivate the camera 121, based on a touch degree of a touch input applied to the touch screen 151 when a pickup gesture occurs or after a pickup gesture occurs. For instance, if a touch input having a pressure exceeding a reference pressure is applied to the touch screen 151 when a pickup gesture occurs or after a pickup gesture occurs, the controller 180 may determine that a user's intentional pickup gesture has occurred. This may prevent an operation to detect a face due to a malfunction.

In FIG. 4A, it is assumed that a touch input having a pressure exceeding a reference pressure is applied to a region on the touch screen 151. However, it is also possible to determine whether a user intentionally grips the mobile terminal or not, by combining a touch sensed on the touch screen 151 with sensing values sensed by a grip sensor disposed on a side surface and a rear surface of the mobile terminal, for a more natural pickup gesture.

For instance, the controller 180 may perform a fingerprint recognition based on a touch input applied to the touch screen 151 while a face detection is performed through the activated camera 121. For this, if a touch input having a pressure exceeding a reference pressure is applied to a region on the touch screen 151, a fingerprint sensor may be activated based on the region.

In this case, the controller 180 may release the locked state based on a result of the aforementioned face recognition and the fingerprint recognition. Since user's two recognitions (authentications) for releasing the locked state are simultaneously performed, a user needs not perform an additional input with more enhanced security.

FIG. 4B shows that a gripped state of the mobile terminal by a user's one hand is sensed by a grip sensor provided on a side surface and/or a rear surface of the terminal body.

In an embodiment, if the aforementioned pickup gesture occurs as a user's grip is sensed by a grip sensor even if a horizontal state is not maintained for a predetermined time, the controller 180 may determine that a pickup gesture for activating the camera has occurred.

If there occurs a tilt gesture as a user's grip is sensed by the grip sensor even if the proximity sensor is temporarily blocked, the controller 180 may determine that a pickup gesture for activating the camera has occurred.

In case of a pocket out gesture, occurrence of a pickup gesture is determined by checking whether the mobile terminal has fallen from a pocket, a bag, etc. through the grip sensor. This may prevent activation of the camera due to a malfunction.

Figure 5A:
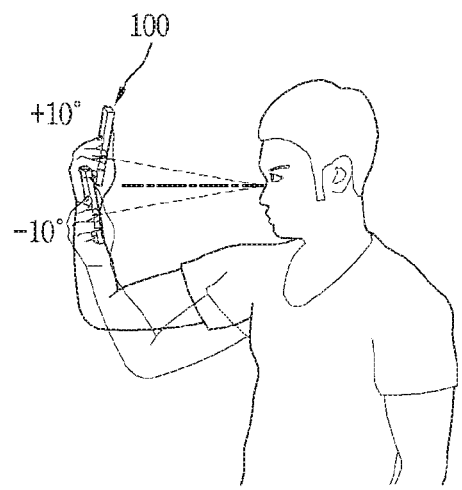
FIGS. 5A~5B and 6A~6C are exemplary conceptual views showing a screen change related to a face detection and a face recognition, in a mobile terminal according to an embodiment of the present invention.
Figure 5B:
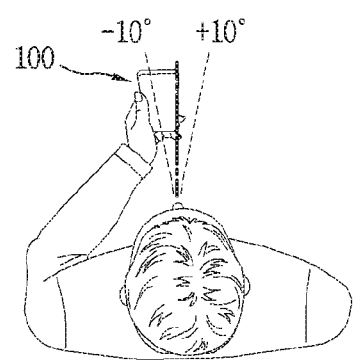

FIGS. 5A and 5B show an operation to detect a face by activating the camera as occurrence of a pickup gesture is sensed.

If the camera 121 of the mobile terminal is activated as a pickup gesture occurs, the controller 180 controls a face image to be detected based on a face detection algorithm stored in the mobile terminal. If a surrounding environment has an illumination of 20 lx or more based on a front of a face, the face is detected with a recognition rate of about 95% or more.

Here, the controller 180 may control a face which is positioned within a predetermined distance from the camera 121, e.g., 20 cm~40 cm, to be detected. Further, when a plurality of faces are detected, the controller 180 may control only one face which satisfies a preset condition, to be detected. While a face detection is being performed, the camera 121 is in an activated state but the display unit 151 is in an off state. That is, a user cannot visually check whether the camera 121 is in an activated or inactivated state.

While a face detection is being performed, the mobile terminal should not move. However, during a face detection, a slight movement of the mobile terminal up and down or right and left may be allowable. Exceptionally, if a slight movement has a rapid speed or is repeated, a face detection may fail. While a face detection is being performed, a user's face should be towards a front side, and eyes, a nose, a mouth and a face outline should be within a range of a view angle of the camera 121. As shown in FIGS. 5A and 5B, a face detection has a high recognition rate within a range of ±10° in right and left directions of the mobile terminal, and within a range of ±10° in upper and lower directions of the mobile terminal. Thus, when the mobile terminal moves out of such a range, a face detection may fail.

It takes about 1 second for the camera to be activated to detect a face. And the display unit 151 is automatically turned on when a face detection is successful. If the mobile terminal is not in a locked state, a home screen is immediately output to the display unit 151. On the other hand, if the mobile terminal is in a locked state, the display unit 151 is turned on according to a face detection, and a lock screen is output.

Although not shown, even while a face detection is being performed through a camera activation, a user may wake up a sleep mode at any time by pushing a power button or a home button. In this case, a face detection processor may be stopped, and a locked state may be released by a preset method to release the locked state (e.g., a pattern input or a PIN input).

FIGS. 6A~6C and 9 show various screen changes related to a face detection and a face recognition, in the mobile terminal according to an embodiment of the present invention.

Figure 6A:
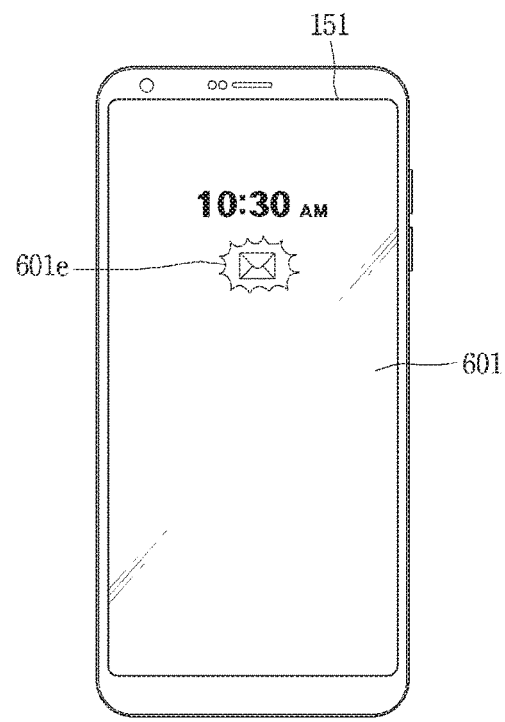

FIG. 6A shows that the camera is activated as a pickup gesture occurs and a face detection fails, when the mobile terminal is in an AOD state as a sleep mode (601). In the present invention, while a face detection is being performed as a pickup gesture occurs and the camera is activated, the display unit 151 has no screen change.

However, if a face detection fails within a predetermined time, a command for notification update may be performed on the AOD screen 601, as shown in FIG. 6A. More specifically, if a face detection fails within a predetermined time, the controller 180 may convert the camera 121 into a deactivated state, and may control the touch screen 151 to display a notification informing an event occurrence in an updated manner.

Even if an event occurs, a notification may be output at preset time intervals, or a notification may be delayed until a sleep mode is released, according to a type of the event. In some cases, a user may not check a previous notification of an occurred event. Accordingly, in the present invention, the controller 180 may output a refresh notification with respect to information stored in an AOD state (e.g., a message arrival), without turning on the display unit 151, under an assumption that a pickup gesture has resulted from a user's intention to check a time or an event occurrence, not a user's intention to use the mobile terminal.

Accordingly, as shown in FIG. 6A, a highlighting effect may be output to the notification icon 601e informing a message arrival, or a preset notification such as vibrations and a sound may be output thereto. Although not shown, notifications of other occurred events may be displayed on the AOD screen 601. Then, after a predetermined time lapses, the mobile terminal is converted into a sleep mode.

In the aforementioned embodiment, since a user needs not frequently release a sleep mode in order to check simple information or an event, battery consumption may be more reduced.

Figure 6B:
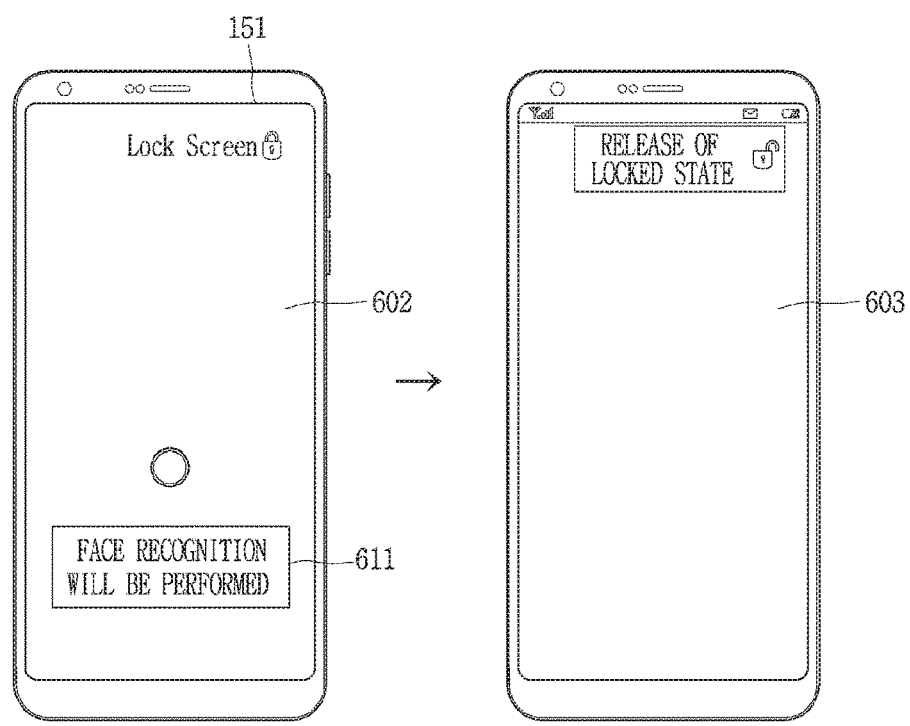

FIG. 6B shows an example of a screen change when both of a face detection and a face recognition succeed.

As shown in FIG. 6B, when a face detection is successful, the display unit 151 is turned on and a lock screen 602 is output. In this case, an indicator 611 indicating that a user's face recognition is being performed, e.g., 'Face recognition will be performed.' is displayed on the lock screen 602. If a face recognition is successful while a user maintains a grip state for a predetermined time, the lock screen 602 is converted into a lock release screen 603.

Figure 6C:
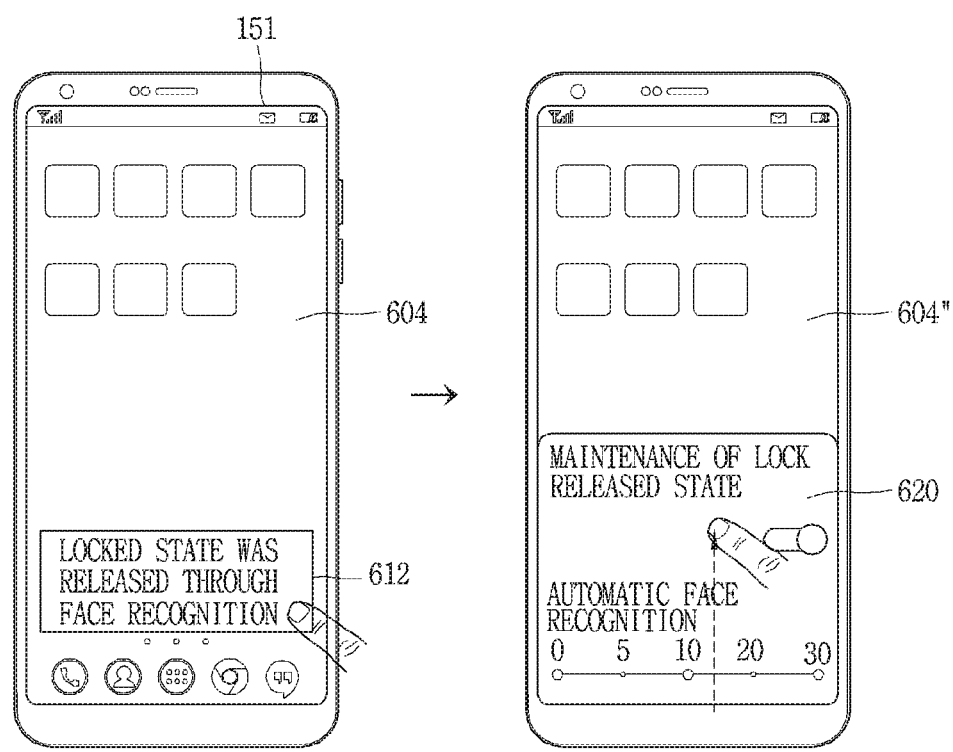

As another example, if a face recognition is successful, as shown in FIG. 6C, notification information 612 indicating a successful face recognition may be output to a lock release screen, e.g., a home screen 604.

In an embodiment, if a touch input is applied to the output region of the notification information 612 before the notification information 612 disappears, a setting menu 620 related to maintenance of a lock released state of the mobile terminal may be output to one region of a lock release screen 604", e.g., a lower end.

The setting menu 620 may include a first menu icon to set whether to maintain a lock released state or not, a second menu icon to set a face recognition time interval for extending a lock released state, etc. The setting menu 620 may disappear when a preset touch gesture (e.g., a downward drag input) is applied to the output region of the setting menu 620.

Figure 9:
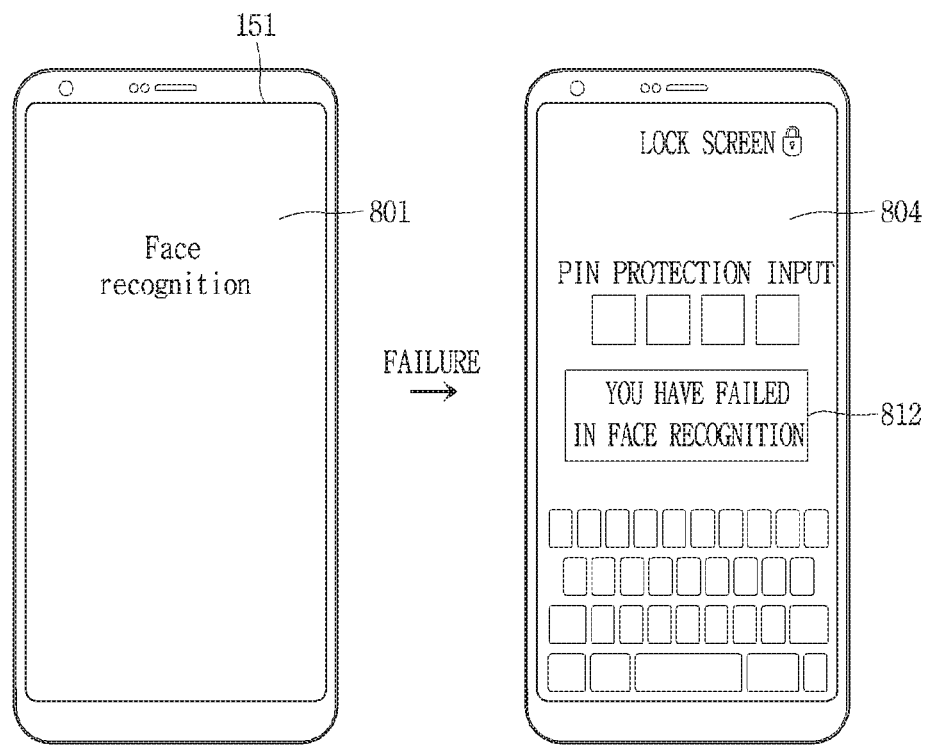
FIG. 9 is a conceptual view showing an example to process when a face recognition fails, in a mobile terminal according to an embodiment of the present invention.

FIG. 9 shows an example to process when a face recognition fails. As shown in FIG. 9, a face recognition screen 801 is output to the display unit 151. Then, if a face recognition fails, a screen related to another recognition means is provided to the display unit 151 together with feedback information 812. For instance, as shown in FIG. 9, a screen 804 requiring for input of a pin number may be output.

Although not shown, a user may preset a type of a lock release screen displayed when a face recognition is successful. For instance, the lock release screen output when a face detection and a face recognition are successful may be an execution screen of a preset application, e.g., an execution screen of a call application.

In the aforementioned embodiments, the camera is activated as a pickup gesture occurs. However, in an embodiment, the camera 121 of the mobile terminal may always maintain an activated state in a low power mode (e.g., Always-On Camera). In this case, if an operation time to activate the camera does not exist when a pickup gesture occurs, a face recognition is performed based on a detected face or a previously detected face, at the same time when the pickup gesture occurs. As a result, time taken to release a locked state is more reduced.

As another example, various operations based on a facial expression change during a face recognition will be explained in more detail with reference to FIGS. 7A~7C and 8A~8B. In the following examples, various analysis results may be provided as a facial expression change is recognized from a face image obtained through the camera 121.

Figure 7A:
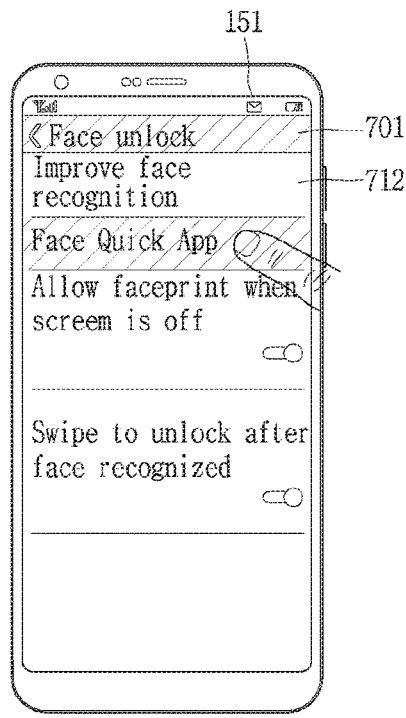
FIGS. 7A~7C and 8A~8B are exemplary conceptual views for explaining various operations implemented based on a facial expression change during a face recognition, in a mobile terminal according to an embodiment of the present invention.
Figure 7B:
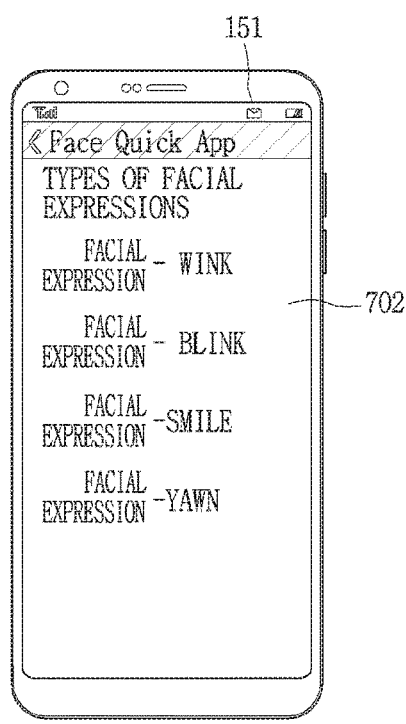

A face lock setting screen 701 of the mobile terminal shown in FIGS. 7A and 7B is an enhanced face recognition menu, and may provide a face quick app setting menu 712. Through the face quick app setting menu 712, executions of different applications may be mapped with user's various registered facial expressions (702). For instance, during a facial recognition, an execution of a first application may be mapped with a winking expression, and an execution of a second application may be mapped with a blinking expression. And an execution of a third application may be mapped with a smiling expression, and an execution of a fourth application may be mapped with a yawning expression. Such mapping information may be stored in the memory 170 of the mobile terminal 100 through a user's input, etc.

As another example, various operations such as terminating a specific application or activating a specific configuration of the mobile terminal (e.g., activation of a recording function), as well as executing an application may be mapped with a specific facial expression.

More specifically, if a preset facial expression is sensed during or after the user's face recognition, the controller 180 may control a lock screen corresponding to a lock state or a lock release screen corresponding to a lock released state, to be converted into an execution screen of an application mapped with the sensed facial expression. In the former case, an execution screen of a mapped application is immediately output to a lock screen. On the other hand, in the latter case, a lock release screen such as a home screen is output, and then the execution screen of the mapped application is output.

Figure 7C:
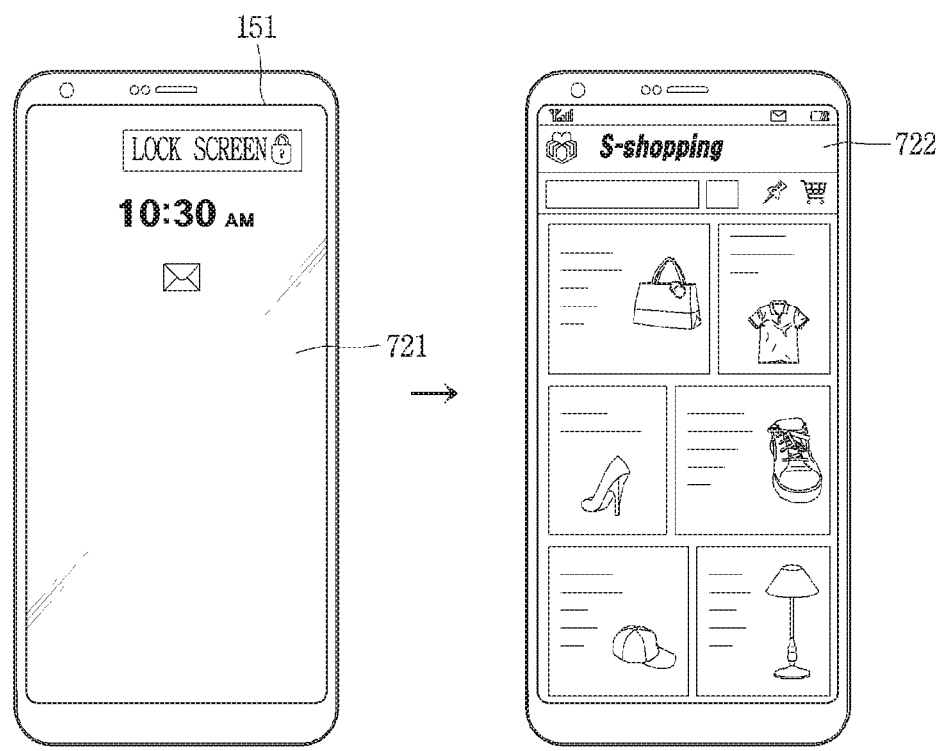

The former case is shown in FIG. 7C. A lock screen 721, displayed when a face recognition is successful and a preset facial expression is sensed, is immediately converted into an execution screen of an application mapped with a preset facial expression, e.g., a specific shopping mall web page screen 722.

Figure 8A:
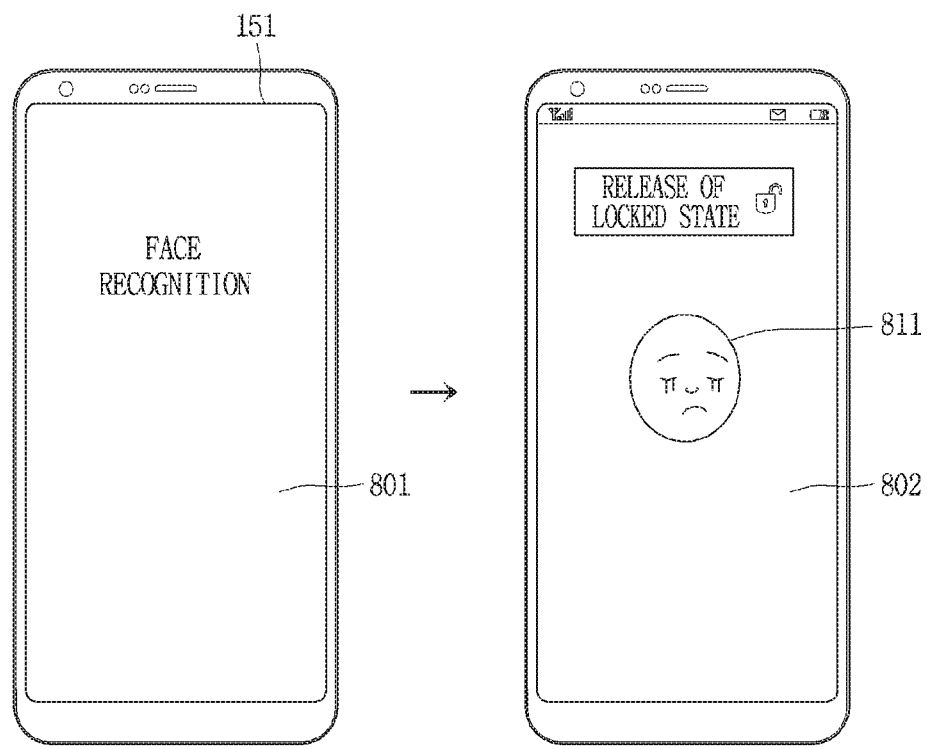
Figure 8B:
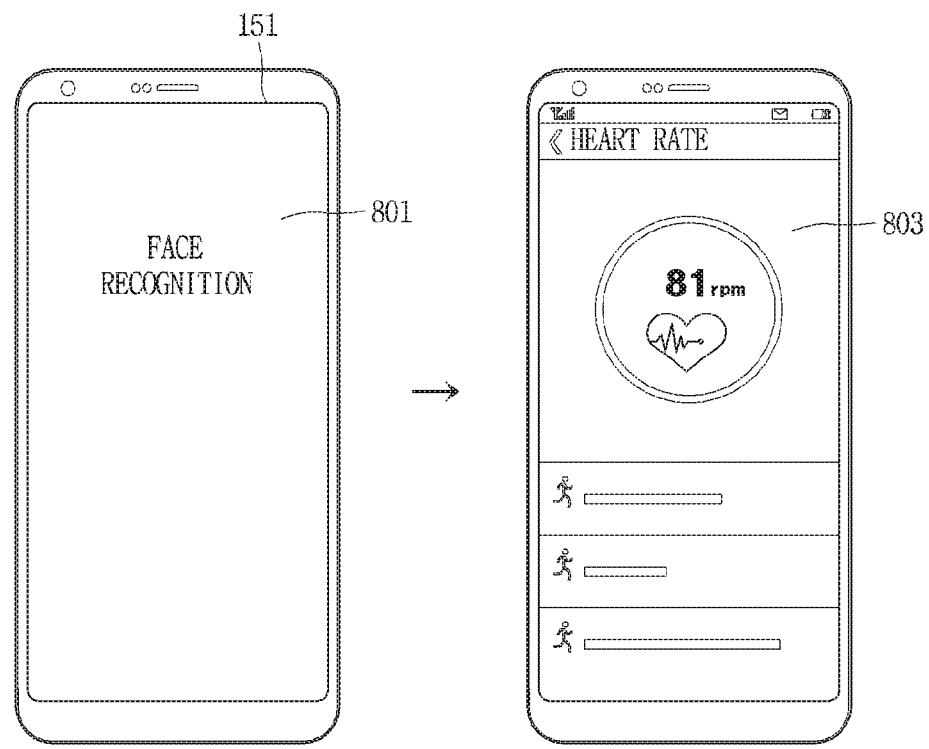

FIGS. 8A and 8B show examples to log-in an emotional state or a health state through a facial expression change which can be analyzed during a facial recognition, not a preset facial expression.

For this, an image recognition may be used in the present invention. The image recognition is a technology to analyze an object disposed on an image. As an example of the image recognition, an emotion recognition API is an algorithm to analyze a facial expression and an emotional state. In the present invention, a facial expression change may be analyzed by various emotion recognition algorithms including an emotion recognition API, through a server, etc. stored in the memory 170 of the mobile terminal or interworked with the memory 170.

For instance, the controller 180 may recognize a user's emotional state based on a facial expression change during the user's face recognition (801). Then, as shown in FIG. 8A, if the locked state is released, the controller 180 may provide an image mapped with the recognized emotional state, e.g., a crying image 811, to a lock release screen 802. Such an emotional state is continuously logged to be stored and collected in the memory 170, etc., in the form of data.

As another utilization, when a user uploads a text to an SNS, etc. or chats with an acquaintance on messenger, the image 811 corresponding to the user's emotional state may be recommended to be uploaded together or to be transmitted. Further, recommendation information for recovering an emotional state to a normal level may be provided based on a history of continuously logged-in facial expression changes. Alternatively, an application may be driven for attempt to dialogue with the mobile terminal, in an extended utilizable manner.

As another example, the controller 180 may acquire user's bio information based on a facial image analyzed during a user's face recognition. Then, when a locked state is released, the controller 180 may log-in the acquired user's bio information, and may provide corresponding screen information, e.g., a heart rate measuring screen 803 to a lock release screen for a predetermined time. For instance, as shown in FIG. 8B, a heart rate may be measured based on a micro change degree of a face color, by using a face heart rate measuring algorithm implemented based on a face color change when a heart beats during a face recognition. For this, the display unit 151 may be turned on when a face detection is successful, and at the same time, a heart rate measuring application may be driven.

With such a configuration, a user may measure health-related data during a face recognition, without measuring a heart rate by executing an additional application. Further, a heart rate measured whenever a locked state of the mobile terminal is released is accumulatively logged, and may be used as an index to continuously manage a health.

Further, since it takes a relatively short time to perform a face recognition, screen information to continue a heart rate measurement may be output to a lock release screen, or a screen to additionally measure health-related data may be output to the lock release screen.

Hereinafter, examples to input a control command according to another embodiment related to a face recognition will be explained in more detail with reference to FIGS. 10 and 11.

The aforementioned pickup gesture may be performed in response to occurrence of an event from one or more applications installed on the mobile terminal. For instance, as shown in FIG. 10, even if the mobile terminal is in a sleep mode, a pickup gesture may occur while the sleep mode is released, as a specific event such as a call reception occurs.

In this case, as aforementioned, a face is detected as the pickup gesture occurs, and a face recognition is performed based on the detected face. In the present invention, there is provided a novel type of user interface which determines a subsequent face gesture as an input of a control command, by considering a pickup gesture according to an event occurrence. More specifically, the controller 180 may perform a user authentication based on a detected face, and may process an event based on a control command corresponding to a subsequent face gesture.

Figure 10:
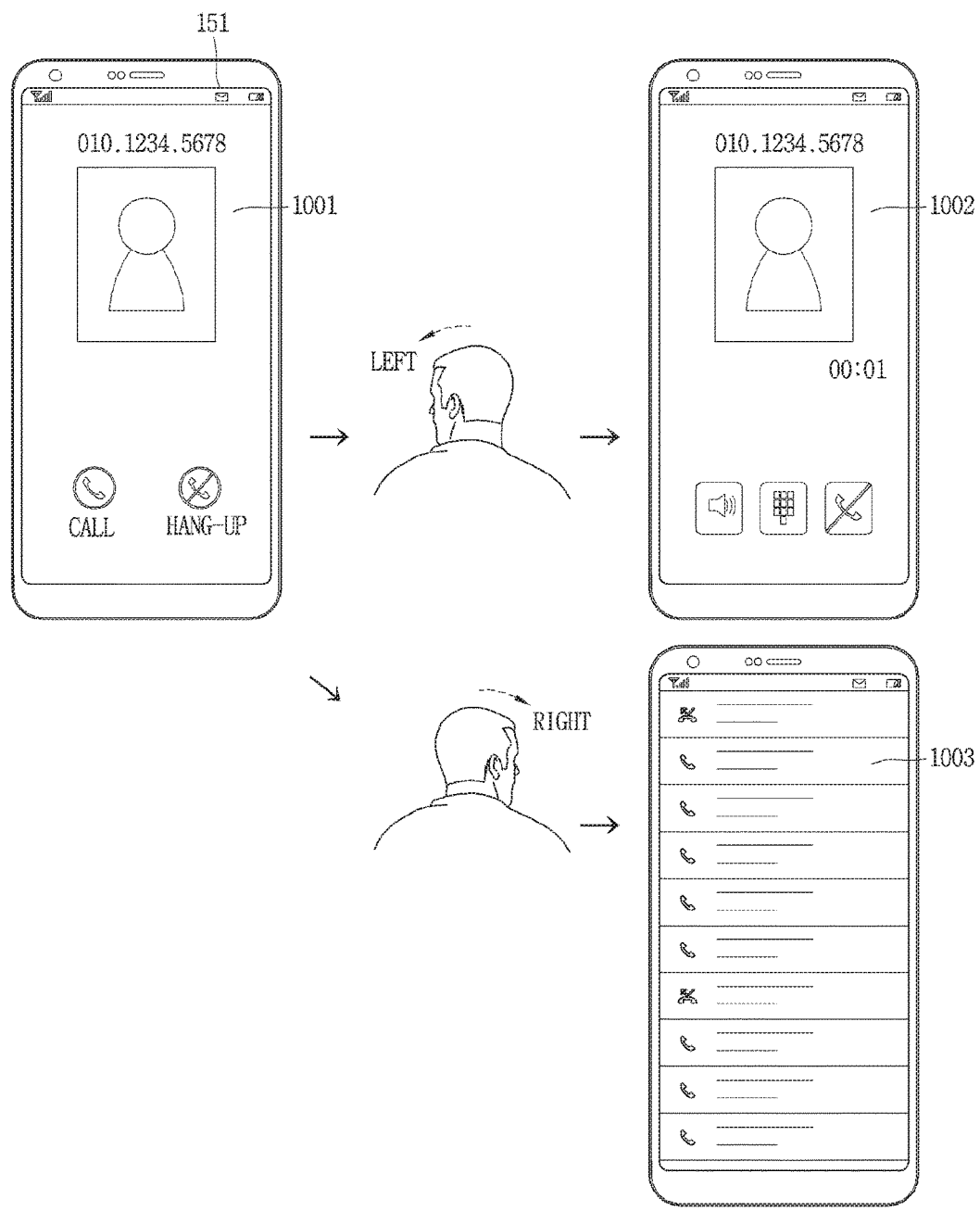
FIGS. 10 and 11 are views showing some of other embodiments related to a face recognition, in a mobile terminal according to an embodiment of the present invention.

Referring to FIG. 10, as a call is received, a call receiving screen 1001 is output to the display unit 151. Then, if a pickup gesture is performed, the camera is activated on a background of the mobile terminal to perform a face detection and a face recognition. Once the face recognition is successful, a face gesture as well as a button input is used as a user interface to input a control command.

Accordingly, if a user rotates the recognized face to the right by a predetermined angle, in correspondence to a position of a hang up button on the call receiving screen 1001, instead of pressing the hang up button, the controller 180 recognizes such a face gesture through the camera 121 to perform a hang up command. As a result, the call receiving screen 1001 may be converted into a call recording screen 1003 as shown in FIG. 10, or a screen (not shown) informing a missed call.

On the other hand, if a user rotates the recognized face to the left by a predetermined angle, in correspondence to a position of a call button on the call receiving screen 1001, instead of pressing the call button, the controller 180 recognizes such a face gesture through the camera 121 to perform a call command. As a result, a call is connected and a call screen 1002 is output. In this case, a speaker may be activated together with the call connection. That is, another person's voice may be output through the speaker such that the user may perform a call while maintaining a grip state of the mobile terminal by one hand.

As another example, if a subsequent put-down gesture is sensed when a face recognition is performed in response to an occurred event, the controller 180 sets a notification corresponding to the event not to be output. The put-down gesture means an operation to put the mobile terminal down after a pickup gesture occurs.

For instance, if there occurs a gesture to put down the mobile terminal by a predetermined angle at a proper speed within a proper time, the gesture may be determined as a put-down gesture. Further, in case of putting the mobile terminal on a floor in an overturning posture such that the touch screen 151 is towards a lower side, it may be determined that a put-down gesture has occurred. Referring to FIG. 10, if a put-down gesture occurs over the call receiving screen 1001, even if a call is additionally received from the same person, a notification (e.g., vibrations, a phone ring tone, etc.) may not be output.

Figure 11:
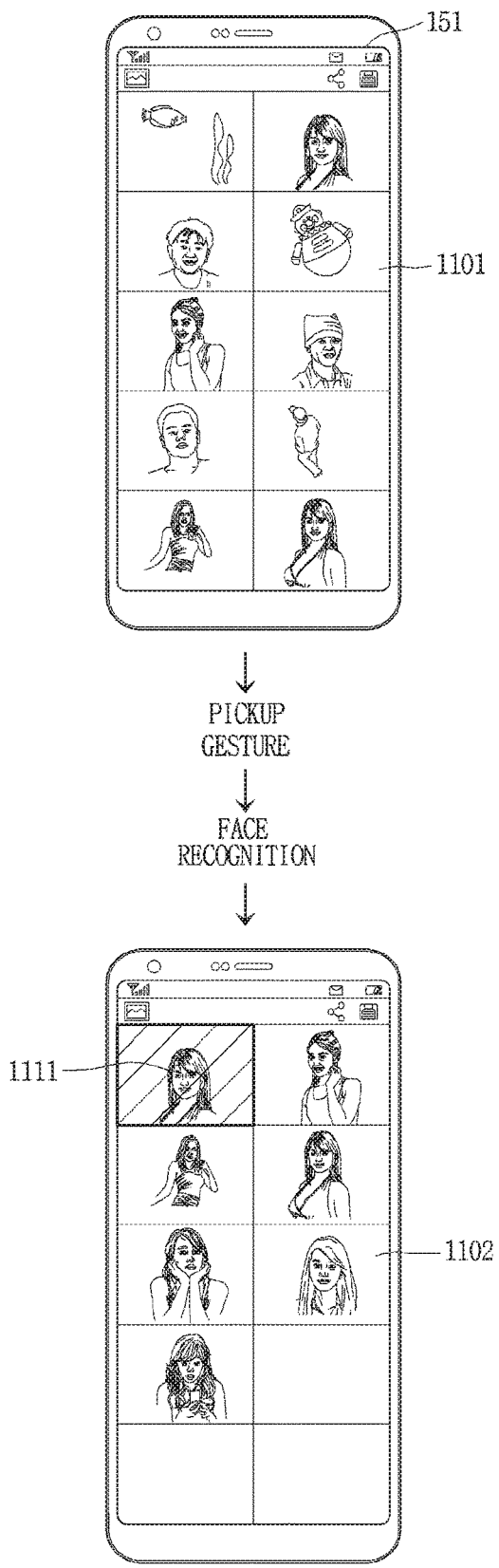

FIG. 11 shows an input of a control command to change an image sorting through a face recognition, to an execution screen of a gallery application.

Referring to FIG. 11, in a state that a list 1101 of a plurality of thumbnail images is output without a specific sorting reference as a gallery application is executed, a user's pickup gesture may occur, and then a face detection and a face recognition may be performed. As a result, the list 1101 may be changed into a list 1102 of photo images including the recognized face, according to a subsequent face gesture (e.g., a nodding gesture).

As aforementioned, the mobile terminal and the method for controlling the same according to the present invention can provide a UX to perform a wakeup function and a lock release function of the mobile terminal, through a user's gesture to lift the mobile terminal without a specific manipulation. Further, a user's emotional state, health state, etc. may be checked and logged based on a facial expression change recognized during a face recognition. Further, since a control command is generated based on a subsequent face gesture together with a face recognition, a new input method can be provided.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

The foregoing embodiments are merely exemplary and are not to be considered as limiting the present disclosure. The present teachings can be readily applied to other types of methods and apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. A mobile terminal, comprising:
a terminal body;
a camera;
a sensor configured to sense a raising gesture of the terminal body;
a touch screen; and
a grip sensor provided on a side surface of the terminal body;
a controller configured to:
determine an occurrence of the raising gesture when a gripped state of the terminal body by a user's hand is sensed by the grip sensor and a degree of a touch input received via the touch screen exceeds a reference pressure;
activate the camera in response to the determination of the raising gesture;
detect a face within an image received via the camera;
perform fingerprint recognition, via a fingerprint sensor of the mobile terminal, based on a second touch input to the touch screen while the face is being detected within the image received via the camera; and
release a locked state of the mobile terminal based on successful fingerprint recognition in addition to successful face recognition of the detected face,
wherein if the face detection is unsuccessful for at least a predetermined time, the controller is further configured to perform a command for updating a notification, control the touch screen to display information regarding the updated notification, and to convert the mobile terminal into a sleep mode after the predetermined time lapses.

2. The mobile terminal of claim 1, wherein:
the raising gesture corresponds to a movement of the terminal body which exceeds a threshold angle change and exceeds a threshold distance change within a reference time;
the controller is further configured to change the mobile terminal from a first mode to a second mode in response to the determination of the raising gesture; and
the face recognition is performed while the mobile terminal is in the second mode.

3. The mobile terminal of claim 1, wherein the controller is further configured to control the touch screen to display a lock screen when the face is detected within the image received via the camera.

4. The mobile terminal of claim 3, wherein the controller is further configured to deactivate the camera when no face is detected within the image received via the camera within a preset time; and
control the touch screen to display an updated notification related to an event at the mobile terminal.

5. The mobile terminal of claim 3, wherein:
an indicator indicating that the face recognition is being performed is displayed on the lock screen; and
the lock screen is changed to a lock release screen when the face recognition is successful.

6. The mobile terminal of claim 5, wherein:
a notification indicating that the face recognition is successful is displayed on the lock release screen; and
the controller is further configured to control the touch screen to display a lock release state setting menu in response to a touch input to the displayed notification.

7. The mobile terminal of claim 5, wherein the lock release screen is an execution screen of a preset application.

8. The mobile terminal of claim 1, wherein the controller is further configured to:
recognize a facial expression of the detected face during the face recognition of the detected face; and
control the touch screen to display an execution screen of a particular application mapped with the recognized facial expression when the locked state is released.

9. The mobile terminal of claim 1, wherein the controller is further configured to:
recognize a facial expression of the detected face during the face recognition of the detected face;
identify an emotion associated with a change in the recognized facial expression; and
control the touch screen to display an image mapped with the identified emotion when the locked state is released.

10. The mobile terminal of claim 1, wherein the controller is further configured to:
determine biometric information of a user based on the detected face; and
store the biometric information and control the touch screen to display a lock release screen when the locked state is released,
wherein information related to the biometric information is displayed on the lock release screen for a predetermined time.

11. The mobile terminal of claim 1, wherein the controller is further configured to control the touch screen to display:
feedback information on a lock screen when the face recognition of the detected face is unsuccessful; and
a screen related to another authentication method using the lock screen.

12. The mobile terminal of claim 1, wherein the raising gesture is sensed following an event at the mobile terminal, and the controller is further configured to:
  recognize a face gesture after the face recognition of the detected face is successful; and
  execute a particular action related to the event, wherein the particular action is mapped to the recognized face gesture.

13. The mobile terminal of claim 1, wherein the raising gesture is sensed following an event at the mobile terminal, and the controller is further configured to:
  cease output of notifications related to the event when a lowering gesture of the terminal body is sensed after the face recognition of the detected face is successful.

14. A mobile terminal, comprising:
  a terminal body;
  a touch screen;
  a grip sensor provided on a side surface of the terminal body;
  a camera configured to maintain a constant activated state in a low-power mode;
  a sensor configured to sense a raising gesture of the terminal body, wherein the raising gesture corresponds to a movement of the mobile terminal which exceeds a threshold angle change and exceeds a threshold distance change within a reference time; and
  a controller configured to:
  determine an occurrence of the raising gesture when a gripped state of the terminal body by a user's hand is sensed by the grip sensor and a degree of a touch input received via the touch screen exceeds a reference pressure;
  detect a face within an image received via the camera in response to the determination of the raising gesture;
  control the touch screen to display a lock screen when the face is detected within the image received via the camera;
  perform fingerprint recognition, via a fingerprint sensor of the mobile terminal, based on a second touch input to the touch screen while the face is being detected within the image received via the camera: and
  release a locked state of the mobile terminal based on the fingerprint recognition in addition to face recognition of the detected face,
  wherein if the face recognition is unsuccessful for at least a predetermined time, the controller is further configured to perform a command for updating a notification, control the touch screen to display information regarding the updated notification, and to convert the mobile terminal into a sleep mode after the predetermined time lapses.

15. The mobile terminal of claim 14, wherein:
  an indicator indicating that the face recognition is being performed is displayed on the lock screen; and
  the lock screen is changed to a lock release screen when the face recognition is successful.

\* \* \* \* \*